H. E. & H. O. SPADE.
UNIVERSAL JOINT.
APPLICATION FILED APR. 29, 1910.

991,807.

Patented May 9, 1911.
2 SHEETS—SHEET 1.

UNITED STATES PATENT OFFICE.

HENRY E. SPADE AND HERBERT O. SPADE, OF VICKSBURG, MICHIGAN.

UNIVERSAL JOINT.

991,807.   Specification of Letters Patent.   Patented May 9, 1911.

Application filed April 29, 1910. Serial No. 558,467.

*To all whom it may concern:*

Be it known that we, HENRY E. SPADE and HERBERT O. SPADE, citizens of the United States, residing at Vicksburg, Michigan, have invented certain new and useful Improvements in Universal Joints, of which the following is a specification.

This invention relates to improvements in universal joints.

The main objects of this invention are: First, to provide an improved universal joint which is a combination of a ball and socket and journal joints. Second, to provide an improved universal joint in which the bearing parts are all arranged so that they are practically contained within a chamber adapted to serve as a lubricant receptacle. Third, to provide an improved universal joint which is capable of transmitting heavy loads, and one which is, at the same time, comparatively simple and compact. Fourth, to provide an improved universal joint embodying these advantages in which the parts are quite simple in form and easily assembled.

Further objects, and objects relating to structural details, will definitely appear from the detailed description to follow.

We accomplish the objects of our invention by the devices and means described in the following specification.

The structure described constitutes one effective embodiment of our invention. Other embodiments would be readily devised by those skilled in the art.

The invention is clearly defined and pointed out in the claims.

Figure 1:
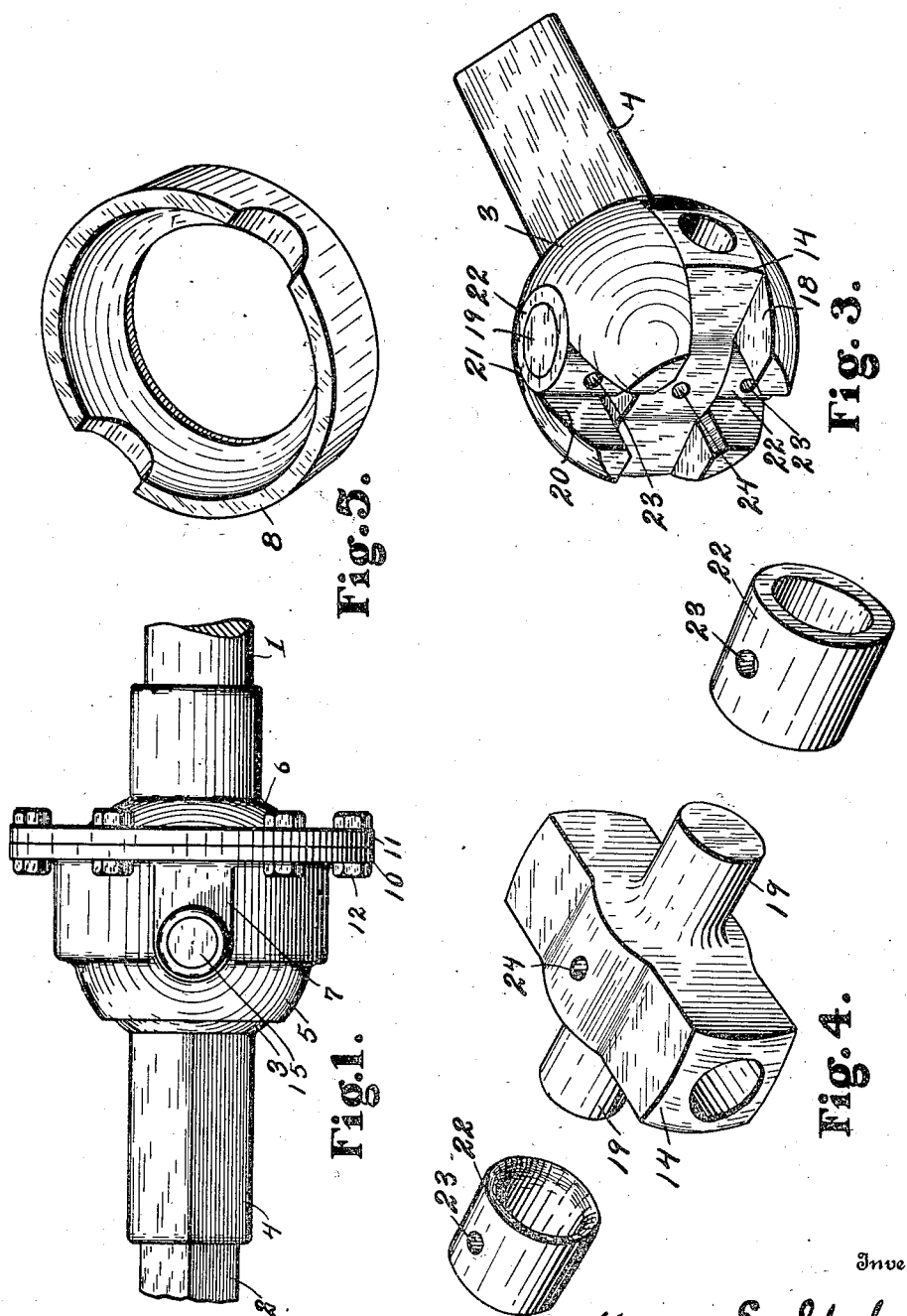
Figure 2:
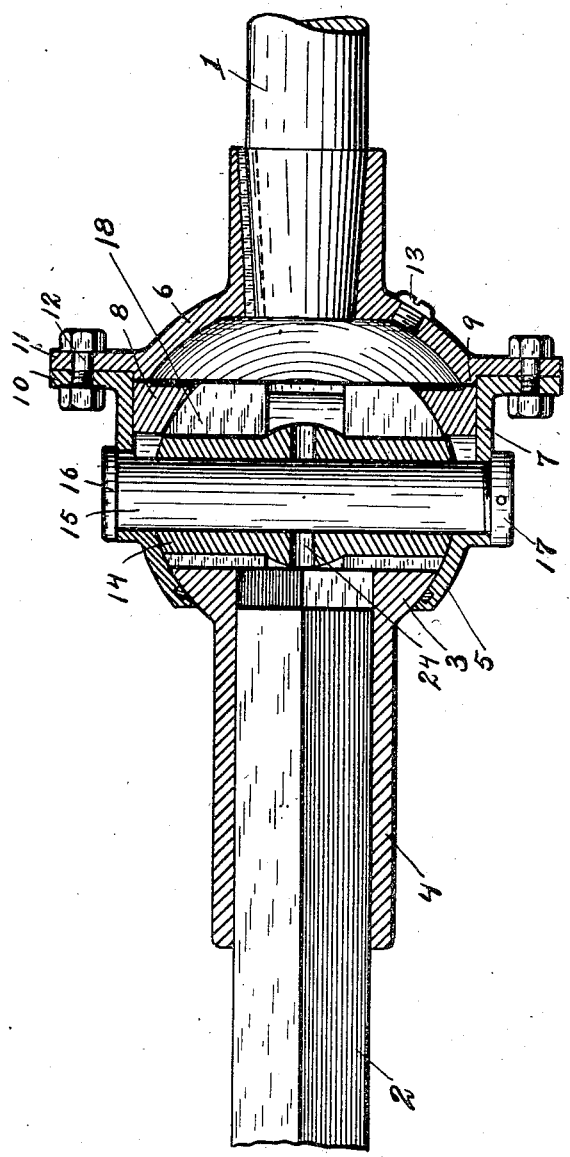

A structure constituting an effective and preferred embodiment of the features of our invention is clearly illustrated in the accompanying drawing, forming a part of this specification, in which:

Figure 1 is a side elevation of a structure embodying the features of our invention. Fig. 2 is an enlarged detail longitudinal section of the structure appearing in Fig. 1, the shafts and the journal pin 15 being shown in full lines. Fig. 3 is a perspective view of the ball member 3 and the journal pin member 14 in their assembled relation. Fig. 4 is a perspective view of the journal pin member 14 and the bushings for its journals disassembled. Fig. 5 is a perspective view of the ring bearing member 8.

In the drawings, similar reference characters refer to similar parts throughout the several views.

Referring to the drawing, 1 and 2 represent shafts in connection with our improved joint, as illustrated. The ball joint member 3 is provided with a hollow shank 4 in which the shaft 2 is slidably arranged. The shaft 1 is coupled to the socket member 5 by a coupling member 6. The socket member 5 is adapted to receive the ball member 3, and has a seat 7 for the ring-like bearing member 8 which coacts with the inner portion of the ball member. The ring bearing member is retained in its seat by the coupling member 6, which is provided with an annular rib 9 which fits into the seat 7 for the bearing member 8, as clearly appears in Fig. 2.

The socket member 5 is preferably provided with an outwardly-projecting flange 10 at its outer end and the coupling member 6 is provided with a coupling flange 11, the flanges being adapted to receive the bolts 12 whereby they are detachably secured together. The ball and socket members 3 and 5 and the coupling member 6 are preferably formed as to constitute a lubricant receptacle or chamber, the coupling member 6 being provided with a lubricant opening which is normally closed with a screw 13.

A journal pin member 14 is provided, having a bearing therein for the journal pin 15, which is carried by the socket member 5, (see Fig. 2), the pin being provided with a head 16 at one end and a nut 17 at the other. The journal member 14 is arranged in the ball member which is provided with a radial slot 18, as is illustrated in the drawing. The journal member 14 is provided with journals 19, preferably formed integral therewith, which are provided with suitable bearings in the ball member. These bearings are provided by forming slots 20 transversely to the slot 18 and seats 21 at the inner ends of the slots for the bushings 22, the diameter of the bushings being greater than the width of the slots 20, and when they are inserted in their seats, the journal member is retained in the ball member.

The bushings are provided with lubricant holes or passages 23 and the journal member 14 with a lubricant passage 24 so that the journals 19 and the journal pin 15 are effectively lubricated. This arrangement of parts also serves as a means of supplying lubricant to the slip connection between the shaft 2 and the shank 4 of the ball member.

Our improved joint, as will be obvious, is a combination of ball and socket and journal joints. It is capable of transmitting very heavy loads and the wear and strain on the parts is minimized. The parts of the structure are comparatively simple and economical to produce and are very easily assembled or disassembled. In disassembling the joint, the coupling member 6 is released from the socket member 5 and the journal pin 15 removed, when the parts are entirely freed.

We have illustrated and described our improved joint in detail in the form in which we have embodied the same, although we are aware that it is capable of considerable variation in structural details without departing from our invention. This form illustrated has, however, various structural advantages, and we desire to be understood as claiming the same specifically in the form illustrated, as well as broadly within the scope of the appended claims.

Having thus described our invention, what we claim as new and desire to secure by Letters Patent is:

1. In a universal joint, the combination of a ball member; a coacting socket member having an outwardly-projecting flange at its outer end; a socket-bearing ring having a bearing surface coacting with the inner portion of said ball member seated in the outer end of said socket member; a coupling member adapted to retain said bearing ring in its seat and coacting with said ball and socket members to provide a lubricant receptacle, said coupling member being provided with an outwardly-projecting flange at its inner end detachably secured to said flange of said socket member; a journal pin member having a journal pin bearing therein and journals disposed transversely of said journal pin bearing, said ball member being provided with radial, transversely-disposed slots in which said journal member is arranged, one of the slots being provided with bearing bushing seats; bushings for said journal member journals arranged in said bushing seats; and a journal pin arranged in said journal pin bearing of said journal member and in openings provided therefor in said socket member.

2. In a universal joint, the combination of a ball member; a coacting socket member having an outwardly-projecting flange at its outer end; a socket bearing ring having a bearing surface coacting with the inner portion of said ball member seated in the outer end of said socket member; a coupling member adapted to retain said bearing ring in its seat and coacting with said ball and socket members to provide a lubricant receptacle, said coupling member being provided with an outwardly-projecting flange at its inner end detachably secured to said flange of said socket member; a journal pin member having a journal pin bearing therein and journals disposed transversely of said journal pin bearing, said ball member being provided with radial, transversely disposed slots in which said journal member is arranged, and a journal pin arranged in said journal pin bearing of said journal member and in openings provided therefor in said socket member.

3. In a universal joint, the combination of a ball member; a coacting socket member; a socket bearing ring having a bearing surface coacting with the inner portion of said ball member seated in the outer end of said socket member; a coupling member adapted to retain said bearing ring in its seat and coacting with said ball and socket members to provide a lubricant receptacle detachably secured to said socket member; a journal pin member having a journal pin bearing therein and journals disposed transversely of said journal pin bearing, said ball member being provided with radial, transversely-disposed slots in which said journal member is arranged, bushings for said journal member journals arranged in said bushing seats; and a journal pin arranged in said journal pin bearing of said journal member and in openings provided therefor in said socket member.

4. In a universal joint, the combination of a ball member; a coacting socket member; a socket bearing ring having a bearing surface coacting with the inner portion of said ball member seated in the outer end of said socket member; a coupling member adapted to retain said bearing ring in its seat and coacting with said ball and socket members to provide a lubricant receptacle detachably secured to said socket member; a journal pin member having a journal pin bearing therein and journals disposed transversely of said journal pin bearing, said ball member being provided with radial, transversely-disposed slots in which said journal member is arranged, and a journal pin arranged in said journal pin bearing of said journal member and in openings provided therefor in said socket member.

5. In a universal joint, the combination of a ball member; a coacting socket member having an outwardly-projecting flange at its outer end; a coupling member coacting with said ball and socket members to provide a lubricant receptacle, said coupling member being provided with an outwardly-projecting flange at its inner end detachably secured to said flange of said socket member; a journal pin member having a journal pin bearing therein and journals disposed transversely of said journal pin bearing, said ball member being provided with radial, transversely-disposed slots in which said journal member is arranged, one of the slots being provided with bushing seats; bushings for said journal member journals arranged in said bushing seats; and a journal pin arranged in said journal bearing of said journal member and in openings provided therefor in said socket member.

6. In a universal joint, the combination of a ball member; a coacting socket member having an outwardly-projecting flange at its outer end; a coupling member coacting with said ball and socket members to provide a lubricant receptacle, said coupling member being provided with an outwardly projecting flange at its inner end detachably secured to said flange of said socket member; a journal pin member having a journal bearing therein and journals disposed transversely of said journal pin bearing, said ball member being provided with radial, transversely-disposed slots in which said journal member is arranged, and a journal pin arranged in said journal pin bearing of said journal member and in openings provided therefor in said socket member.

7. In a universal joint, the combination of a ball member; a coacting socket member; a coupling member coacting with said ball and socket members to provide a lubricant receptacle detachably secured to said socket member; a journal pin member having a journal pin bearing therein and journals disposed transversely of said journal pin bearing, said ball member being provided with radial, transversely-disposed slots in which said journal member is arranged, one of the slots being provided with bearing bushing seats; bushings for said journal member journals arranged in said bushing seats; and a journal pin arranged in said journal pin bearing of said journal member and in openings provided therefor in said socket member.

8. In a universal joint, the combination of a ball member; a coacting socket member; a coupling member coacting with said ball and socket members to provide a lubricant receptacle detachably secured to said socket member; a journal pin member having a journal pin bearing therein and journals disposed transversely of said journal pin bearing, said ball member being provided with radial, transversely-disposed slots in which said journal member is arranged, and a journal pin arranged in said journal pin bearing of said journal member and in openings provided therefor in said socket member.

9. In a universal joint, the combination of a ball member; a coacting socket member; a socket bearing ring having a bearing surface coacting with the inner portion of said ball member seated in the outer end of said socket member; a coupling member adapted to retain said bearing ring in its seat and coacting with said ball and socket members to provide a lubricant receptacle detachably secured to said socket member; a journal pin member journaled in said ball bearing member; and a journal pin carried by said socket member, arranged in said journal pin member.

10. In a universal joint, the combination of a ball bearing member; a coacting socket bearing member; a coupling member coacting with said ball and socket bearing members to provide a lubricant receptacle detachably secured to said socket member; a journal pin member journaled in said ball bearing member; and a journal pin carried by said socket member, arranged in said journal pin member.

11. In a universal joint, the combination of a ball member; a coacting socket member; a socket bearing ring having a bearing surface coacting with the inner portion of said ball member seated in the outer end of said socket member; a coupling member adapted to retain said bearing ring in its seat and detachably secured to said socket member; a journal pin member journaled in said ball bearing member; and a journal pin carried by said socket member, arranged in said journal pin member.

12. In a universal joint, the combination of a ball member; a coacting socket member; a journal pin member having a journal pin bearing therein and journals disposed transversely of said journal pin bearing, said ball member being provided with radial transversely disposed slots in which said journal pin is arranged, one of said slots being provided with bushing seats; bushings for said journal member journals arranged in said bushing seats whereby said journal member is secured to said ball member; and a journal pin arranged in said journal pin bearing of said journal member to engage said socket member.

13. In a universal joint, the combination of a ball member; a coacting socket member; a journal pin member having a journal pin bearing therein and journals disposed transversely of said journal pin bearing, said ball member being provided with radial transversely disposed slots in which said journal member is arranged; and a journal pin arranged in said journal pin bearing of said journal member to engage said socket member.

In witness whereof, we have hereunto set our hands and seals in the presence of two witnesses.

HENRY E. SPADE. [L. S.]
    HERBERT O. SPADE. [L. S.]

Witnesses:
    FLOYD BENDER,
    W. L. EWING.